Nov. 27, 1923.
F. S. HUDSON ET AL
1,475,433
CONTROLLER FOR FUEL OIL BURNERS
Filed Feb. 24, 1921   3 Sheets-Sheet 2
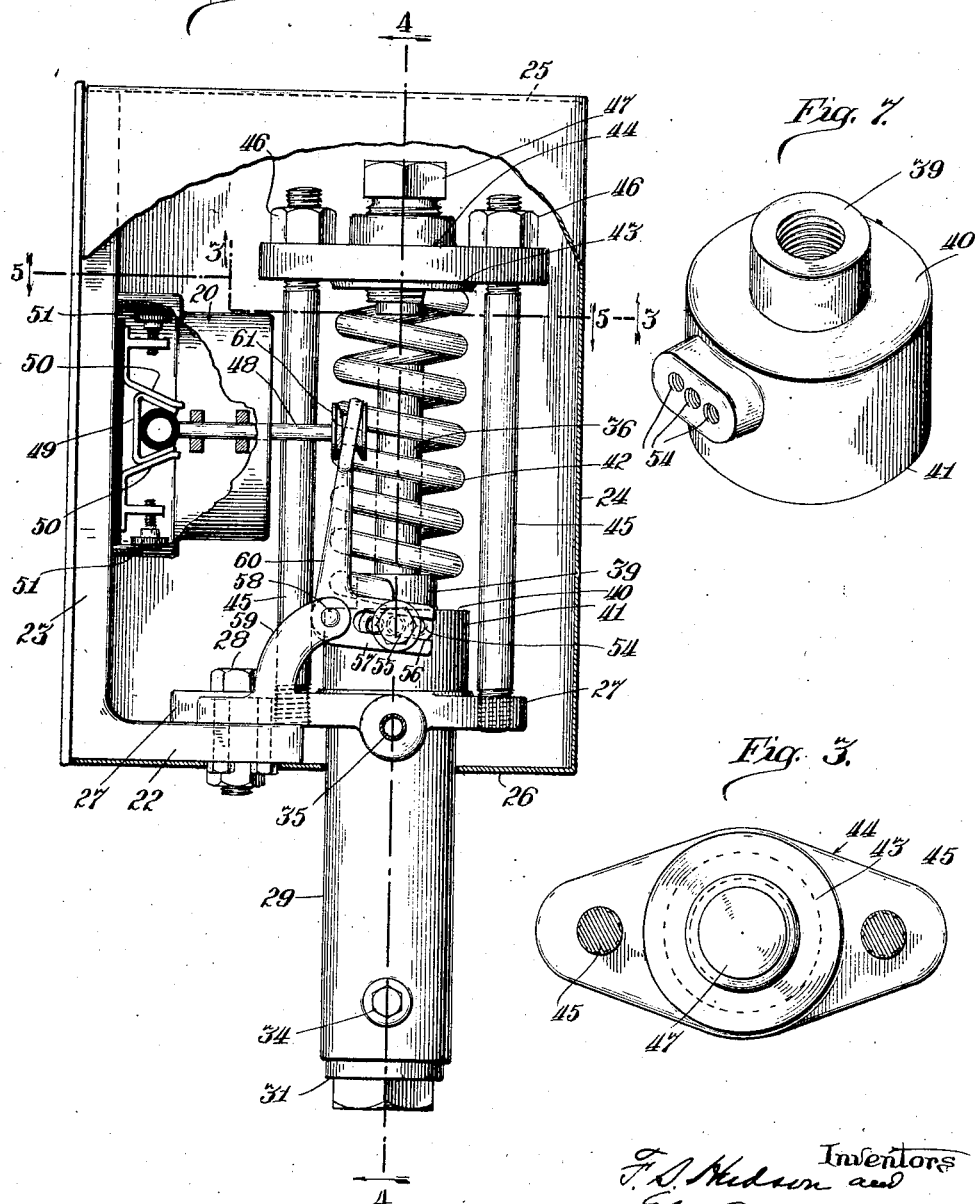
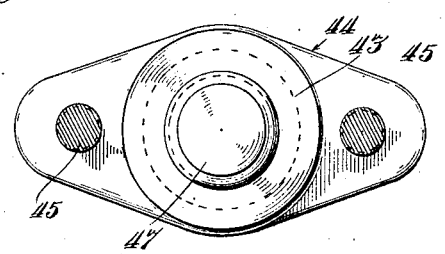
Inventors
F. S. Hudson and
E. G. Rhoads
By J. M. Roberts
Their Attorney

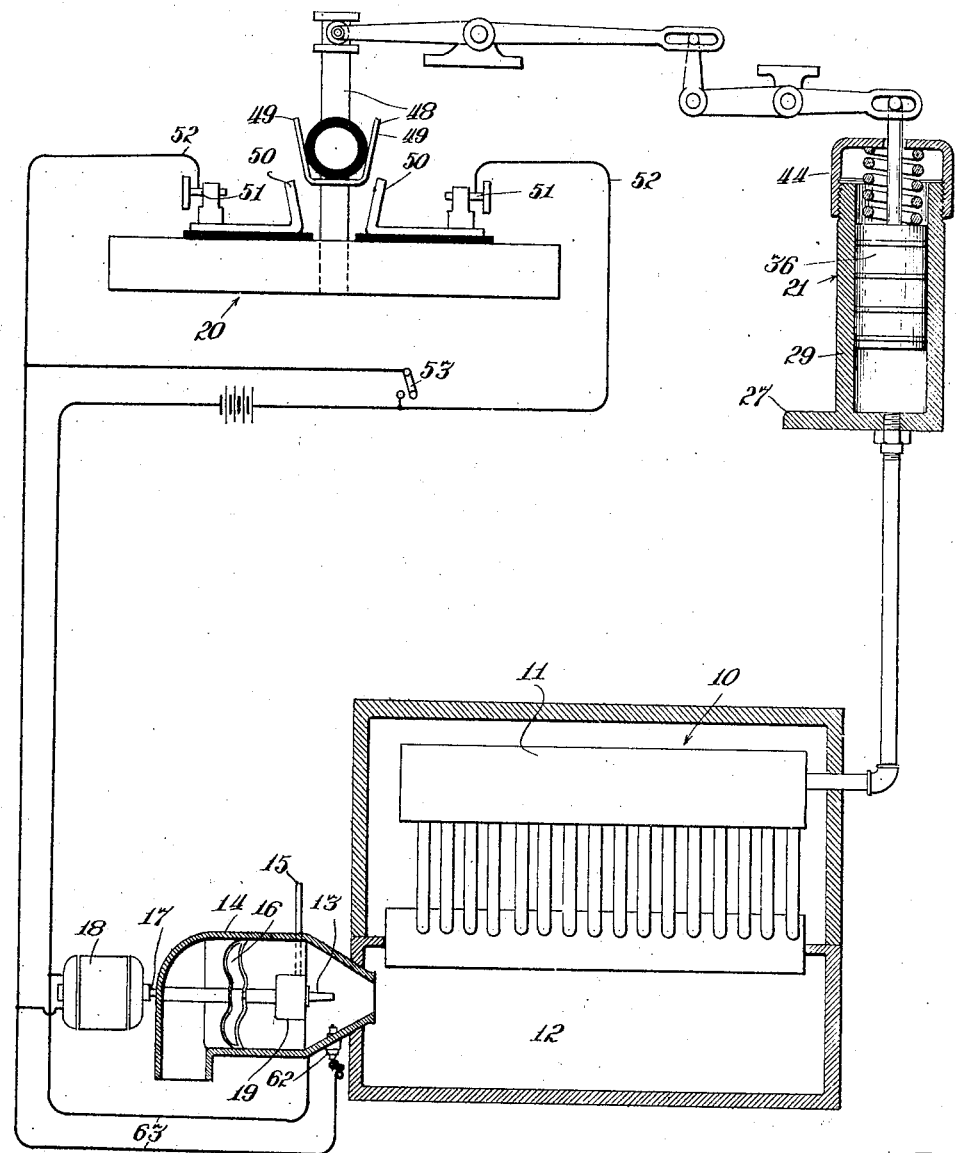

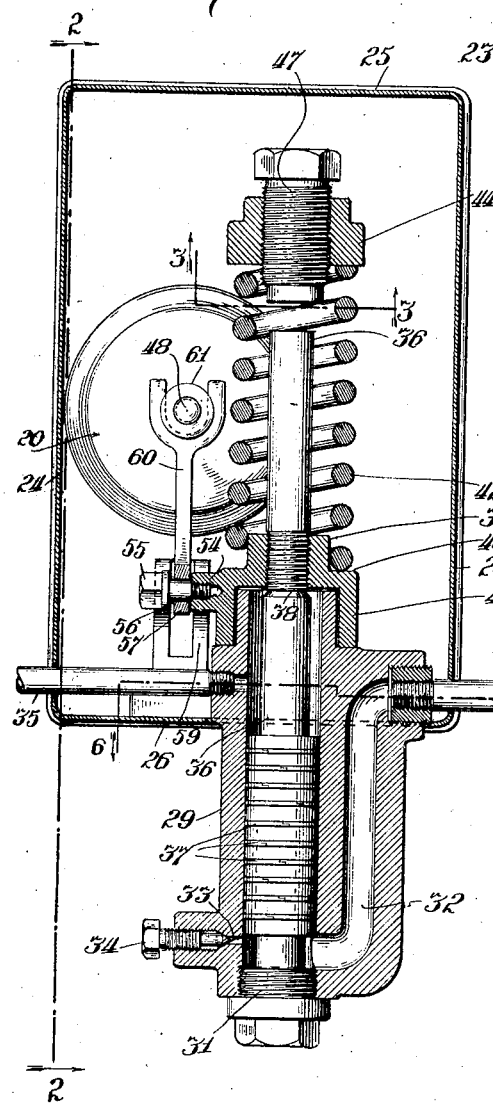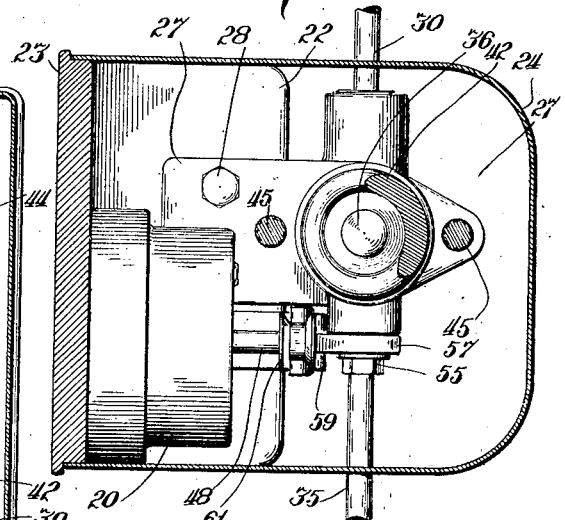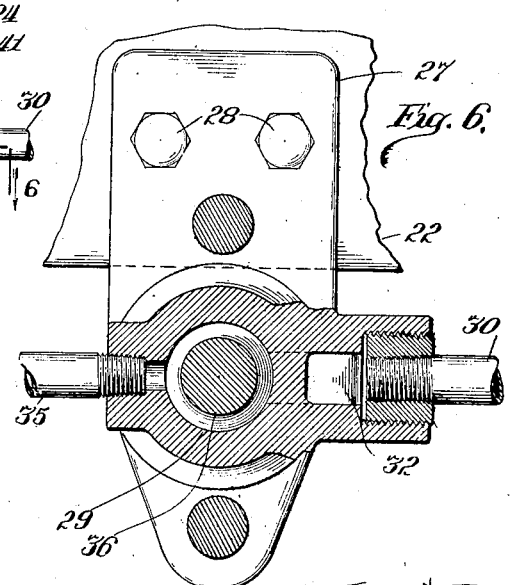

Patented Nov. 27, 1923.

1,475,433

UNITED STATES PATENT OFFICE.

FINN S. HUDSON, OF KANSAS CITY, MISSOURI, AND EDGAR G. RHOADS, OF OAK PARK, ILLINOIS.

CONTROLLER FOR FUEL-OIL BURNERS.

Application filed February 24, 1921. Serial No. 447,582.

*To all whom it may concern:*

Be it known that we, FINN S. HUDSON and EDGAR G. RHOADS, citizens of the United States, and residents, respectively, of Kansas City, county of Jackson, State of Missouri, and Oak Park, county of Cook, State of Illinois, having jointly invented certain new and useful Improvements in Controllers for Fuel-Oil Burners, do hereby declare that the following is a full, clear, and exact description of the same.

Our invention provides a controlling device for fuel-oil burners for steam boilers that operates in one direction under a relatively high steam pressure to cut off the supply of fuel to the fire-pot of the boiler and in the opposite direction to restore the supply when the steam pressure is reduced, the device being set to respond to the higher pressure and lower pressure alternately within such limits that a slight variation of the steam pressure in the boiler will result in a corresponding movement of the controller, whereby the supply of fuel to the fire-pot is automatically regulated to maintain practically stable heat conditions in the combustion chamber and uniform generation of steam for all normal working conditions of the boiler.

The invention consists in the matters hereinafter described and then pointed out in the appended claims.

In the drawings Fig. 1 is a diagrammatic view of the device with the casing of the boiler and other parts in section;

Fig. 2 is a view of the switch mechanism in side elevation with its casing broken away, the view being taken on the line 2—2 of Fig. 4;

Fig. 3 is a detail sectional view on the line 3—3 in each of Figs. 2 and 4 showing the underside of the spring-tension plate with its bolts in section;

Fig. 4 is a central vertical sectional view on the line 4—4 in Fig. 2;

Fig. 5 is a cross-sectional view on the line 5—5 in Fig. 2;

Fig. 6 is a similar view on the line 6—6 in Fig. 4, and

Fig. 7 is a detail side view of the cylinder cap.

In Fig. 1 the reference numeral 10 represents a typical boiler or steam generator of any suitable kind, adapted to carry in practice pressures of the order of several hundred pounds to the square inch if desired; for convenience of illustration the boiler shown is of the well-known water-tube type having a steam-header or drum 11 for the unit of tubes shown, it being understood that the boiler may comprise a number of units or sections of water-tubes which are connected to the header. A combustion chamber or fire-box 12 is located beneath the boiler and is open at its top so that the heat passes directly into the boiler casing, and the fuel is introduced into the fire-box by means of any suitable motor-operated mixture forming and propelling device. In the structure shown the fuel-oil atomizer 13 is located in the mixing-chamber 14 adjacent its point of delivery to the fire-box and is connected as by pipe 15 to any suitable source of fuel-oil supply, and an air-blower 16 is located in the mixing-chamber in front of the oil-atomizer and is of a type capable of delivering a sufficient quantity of air to form a highly combustible fuel mixture with the atomized oil. In practice the blower is in the form of a fan operated by a shaft 17 which is suitably journaled in bearings in the mixing-chamber and driven by an electric-motor 18, and preferably the fuel-oil is supplied to the atomizer by an oil-pump 19 which is driven by the shaft; while the oil-supply may be controlled by any suitable means it is preferred to use some device controlled by the shaft that drives the fan as then the air and oil supplied to form the fuel are simultaneously controlled. The motor is controlled by an electric-switch 20 which in turn is controlled by a steam-actuated switch 21 connected to the boiler so that any variation in the pressure in the boiler within predetermined limits will result in a corresponding movement of the switches.

The electric switch mechanism may be of any suitable type, such for example as that illustrated in Fig. 1, and a steam switch of a practical form is shown in detail in Figs. 2 to 4, it being understood that the operative connections between the switches may be made in any suitable manner and preferably as shown in the latter figures of the drawing. In practice both switches are supported in position upon a bracket which in the present instance consists of a horizontal shelf 22 and an upright wall 23, provided with an enclosing casing 24 having top and bottom walls 25 and 26, respectively, all forming a rectangular housing as shown. The shelf 22 supports a rectangular base 27, which is bolted thereto as at 28 and extends beyond the edge thereof where it carries a piston-cylinder 29, that is connected at its lower end by a steam pipe 30 to the boiler, the connection in the form of boiler shown in Fig. 1 going of course to its steam-header. In practice it is preferred to make the cylinder 29 integral with the base-plate 27 and depending therefrom through a suitable opening in the bottom of the housing, with its lower end closed by a screw-plug 31 and the steam inlet near its bottom supplied through a passage 32 formed in a lateral enlargement of the cylinder wall and connected by a steam-tight joint to the pipe 30 which leads from the boiler. The cylinder is provided opposite the steam inlet with a purge opening 33 normally closed by a threaded purge-valve 34, and near its upper end it is provided with a vent-pipe 35. The cylinder is open at its top and receives a piston 36 which is provided at its lower portion with an elongated head which fits the cylinder bore and is equipped with a series of piston-rings 37 to make a pressure tight and leak proof seal between the head and cylinder. When the piston is in its lower position in the cylinder the lower end of its head is in operative relation just above the steam inlet and its upper end extends above the open end of the cylinder, being reduced in diameter to form a shoulder 38 at the top of the cylinder and threaded above the shoulder to receive an internally threaded cap 39 which is provided with a horizontal shoulder at 40 and extends downwardly in a skirt at 41 to enclose the open end of the cylinder. A coiled spring 42 surrounds the upper end of the piston and restrains its upward movement, its lower end rests on the shoulder 40 of the cap and its upper end rests in a circular grove 43 in the underside of a spring-tension plate 44 which is adjustably carried upon the upper ends of a pair of bolts 45 that are arranged upon opposite sides of the spring and seated at their lower ends in tapped openings in the base 27. The plate 44 is drilled to loosely receive the bolts, which are threaded at their upper ends to receive the adjusting and retaining nuts 46, and the plate is provided with a central threaded opening to receive the adjustable screw abutment 47 which is arranged in the line of the piston and limits its upward movement. The piston is held by the spring against the steam pressure from the boiler up to a predetermined stress, and the tension of this spring may be regulated by adjusting the plate 44 on its bolts so as to give various piston movements for the same steam pressure, or it may be set to give a certain piston movement for a certain steam pressure. By changing the compression and resistance of the spring by adjusting its plate 44 the operating characteristics of the piston may be modified so that its reciprocation will occur under different steam pressures to control the fire under the boiler.

The piston in its reciprocations opens and closes the electric switch 20 which controls the flow of current to the motor 18 from a suitable source of supply, such as the electric battery as shown in Fig. 1. In the exemplification shown the electric switch 20 comprises the plunger-rod 48 which is mounted in bearings in the switch-case to reciprocate in the usual manner and carries an insulated contact 49 that makes and breaks the circuit through opposite contacts 50 to which the binding-posts 51 for the circuit-wires 52 are connected. The circuit includes a battery as shown and may have a hand-switch 53 to initially start the device for its daily or usual run and to stop it when the run is completed.

The operative connections between the two switches may be made in any suitable manner, as by the lever system shown in Fig. 1, and preferably as shown in the other figures when the form of steam-switch there illustrated is employed. In such case the cap 39 is provided on one side with a series of parallel holes 54 as shown in Fig. 7 tapped to receive a screw-threaded pin 55 which lies on the open-ended diagonal slot 56 of the horizontal arm 57 of a bell-crank lever pivoted at 58 on a bracket 59 secured to the base, the vertical arm 60 of the lever being forked at its top transversely to the slot 56 to engage a spool 61 carried on the outer end of the plunger-rod 48 of the electric switch.

When the boiler pressure is at zero the electric switch is closed as shown in Fig. 2, and the switch 53 being now closed current flows to the motor 18 which drives the air-fan and oil-pump, the fan causing a draft under the boiler sufficient to burn up the fuel formed by the mixture of the air and the oil atomized or sprayed by the part 13, the fuel being ignited by a spark-plug 62 in an ignition circuit 63. The spring 42 is set to prevent the outward movement of protraction of the piston until the steam pressure in the boiler reaches a predetermined stress or strain, say 550 pounds to the square inch in a high-pressure steam plant; when that pressure is reached the piston is protracted against the force of the spring, whose tension of course increases as its compression increases, and the parts are so related that when the steam pressure reaches a predetermined higher stress, say 650 pounds to the square inch, the piston is protracted sufficiently to open the electric switch, and conversely when the steam pressure in the boiler falls to 550 pounds the spring retracts the piston to its inward position, and the electric switch is closed. When the heat generated in the fire-box raises the steam pressure in the boiler to the predetermined upward stress, the piston moves outwardly and opens the electric switch, thereby shutting off the motor and the supply of air necessary for combustion of the fuel, as well as the supply of fuel-oil when its controlling device is operated by the motor. This stops the combustion in the fire-pot. As soon as the pressure in the boiler falls to the predetermined lower stress the piston is moved inwardly by its spring and closes the electric switch to again start the fire under the boiler. By setting the spring 42 to exert any predetermined pressure on the piston the electric switch is closed and the fire under the boiler is started when the boiler-pressure falls to that stress, and when the boiler-pressure rises to any predetermined higher stress the steam pressure on the piston overcomes the force of the spring and the electric switch is opened and the fire under the boiler is shut-off. By this organization the electric switch is alternately opened when the piston is protracted and closed when the piston is retracted, and the supply of fuel to the fire-box is automatically regulated and the fire or flame under the boiler is correspondingly governed. The piston stroke is short, being about three-eighths (⅜) of an inch in practice; and in either a high-pressure plant such as above noted or in a low-pressure plant, with a burner capable of delivering heat commensurate with the boiler requirements, the device is so sensitive and rapid in its action that the flame is alternately on for twelve (12) seconds and off for twenty-four (24) seconds, so that a practically uniform head or pressure of steam is maintained in the boiler for its usual working operations. The limits within which the device operates are sufficiently close to prevent the steam pressure from either going above or falling below the stress required for that purpose.

The pin 55 may be set at different distances from the pivot 48 to rock the elbow-lever more or less according to the extent of motion which it is desired to give to the switch rod 48, and the stop 47 may be adjusted to limit the outward movement of the piston according to the extent of motion which it is desired to have.

We claim:

1. In a device of the class described, a steam-generating boiler having a fire-pot, a fuel-oil supply, an air-blower, an electric motor for the air-blower, an electric circuit for the motor having a switch, a cylinder open at one end and communicating with the boiler at its other end, a piston in the cylinder having its outer end projecting outside the cylinder, a cap on the outer end of the piston, a spring on the cap restraining the piston in the cylinder, an adjustable pin on the cap, and connections between the switch and pin to open the switch when the piston is operated by steam-pressure and to close it when the piston is operated by its spring.

2. In a device of the class described, a steam-generating boiler having a fire-pot, a fuel-oil supply, an air-blower, an electric motor for the air-blower, an electric circuit for the motor having a switch, a cylinder open at one end and communicating with the boiler at its other end, a piston in the cylinder having its outer end projecting outside the cylinder, a cap on the outer end of the piston and provided with a pin, a spring on the cap restraining the piston in the cylinder, and a lever between the switch and pin to open the switch when the piston is operated by steam-pressure and to close it when the piston is operated by its spring.

3. In a device of the class described, a steam-generating boiler having a fire-pot, a fuel-oil atomizer, an air-blower to deliver the fuel to the fire-pot, an electric motor for the blower, an electric circuit for the motor having a switch, a cylinder having a piston and communicating with the boiler below the piston, a spring restraining the piston in its cylinder, an adjustable plate to vary the tension of the spring, a cap on the piston having an adjustable pin, and a lever co-operating with the pin and switch to open the latter when the piston is protracted and to close it when the piston is retracted.

FINN S. HUDSON.
EDGAR G. RHOADS.